United States Patent Office 2,746,938
Patented May 22, 1956

2,746,938

SULFONATED METHYLBENZENE-HALOGENATED HYDROCARBON CONDENSATION PRODUCTS AS CATION EXCHANGE RESINS

Wilhelm Ehm and Robert Schnegg, Dormagen, Germany, assignors to Farbenfabriken Bayer Aktiengesellschaft, Leverkusen, Germany, a corporation of Germany No Drawing. Application May 6, 1952,
Serial No. 286,420

Claims priority, application Germany May 10, 1951

16 Claims. (Cl. 260—2.2)

The present invention relates to cation exchangers and to a process of producing same.

It has already been proposed to produce cation exchangers by sulfonating plastic, elastic condensation products which are obtained by reacting ethylene halides and compounds of the general formula R—$C_6H_4$—R′, wherein R and R′ stand for hydrogen or saturated radicals containing more than one carbon atom, in the presence of catalysts according to "Friedel-Crafts" under controlled reaction conditions. The sulfonation products thus obtained have various disadvantages; they show a high swelling capacity in water, a low stability to chemical influences and poor mechanical properties so that they have not gained practical importance as cation exchangers up to the present.

We have found that cation exchangers which are devoid of the drawbacks associated with the product produced according to the abovesaid prior art method are obtained by reacting sulfonating agents on solid infusible condensation products which are obtained by causing to react liquid aromatic and/or hydroaromatic hydrocarbons or derivatives thereof and/or aralkyl compounds containing one or more aliphatic and/or aromatic radicals in the molecule, optionally in the presence of solid hydrocarbons, with at least one polyhalogenated paraffin, in the presence of at least one catalyst according to "Friedel-Crafts" at elevated temperature at least until the reaction products solidify, preferably while comminuting the resultant reaction products.

During manufacture of the condensation products the liquid reaction components are transformed into a solid condition. It is of advantage to effect this transition not too fast since, otherwise, the reaction material is changed into a blown, coarsely porous mass which readily sticks to the walls of the reaction vessel and to surfaces of the stirring contrivances.

While effecting gradual solidification the reaction material can be broken into small pieces by means of appropriate stirring devices. As long as the small pieces are still plastic, they are compressed to form finely porous, spherical substances by the continuous stirring operation and are solidified in this form during progressing condensation. The velocity of solidification and the properties of the resulting condensation products depend on the reaction conditions applied. Solidification and properties of the products are controlled by the selection and quantitative proportions of the reactants, i. e. the hydrocarbon, the polyhalogenated paraffins and the "Friedel-Crafts" catalyst as well as the temperature and time of condensation reaction.

In the above condensation reaction a chain-like bond of the aromatic nuclei by means of alkylene bridges is initially effected. At this stage of condensation the products are plastic or still liquid. In the further course of condensation cross-linking between the chains occurs, whereby the condensation products become rubber-like and later on insoluble, hard, solid, and infusible. The degree of cross-linkage of the condensation products increases with the quantity of the polyhalogenated paraffin and the reaction time.

The degree of cross-linkage is only slightly influenced by the quantity of catalyst used. The minimum amount required generally amounts to $\frac{1}{10}$ of the weight of the ethylene chloride which is preferably employed. The application of a larger quantity entails an increase in reaction velocity.

By using, for instance, 1 mol of toluene, xylene or benzene and 1.2 mols of ethylene chloride, liquid condensation products or products are formed which are liquid at higher temperatures, for instance at 80° C., however, solid at room temperature, even when the reaction mixture is heated to 80–90° C. and higher temperatures for 24 hours or for a longer period. The use of 1.3 mols or a larger quantity of ethylene chloride per 1 mol of hydrocarbon results in solid, infusible condensation products, provided that the reaction is carried out for an adequately long space of time. It has proved to be especially advantageous to employ in the reaction 1.5 mols of ethylene halide per 1 mol of hydrocarbon, to heat the mixture to about 80° C. and to cause the components to react while continually stirring. In this reaction the reaction material suddenly turns plastic and rubber-elastic after about 2 hours. Heating is then continued until the reaction mass has become solid which is accomplished after another 1–2 hours.

The application of hydrocarbon mixtures consisting of two or more components, such as toluene and benzene, or of toluene, benzene and naphthalene, has proved to be especially useful according to the invention. Furthermore, it is possible to employ, instead of ethylene chloride, ethylene bromide, ethylene iodide, a mixture of higher aliphatic di- or polyhalogenated compounds, for instance dichloropropane, trichlorobutane, tetrachloropentane, or of bromides or iodides of said compounds, or each compound as such.

The combination of various hydrocarbons permits an easy control of the velocity of the transition of the reactants from the liquid into the solid state, which occurs during condensation. By admixing a larger or smaller quantity of a hydrocarbon, for instance naphthalene, which under the reaction conditions yields a liquid condensation product, the transition of the reaction material from the liquid to the solid state is retarded to a higher or lesser degree.

A mixture of ethylene chloride, toluene, benzene and naphthalene, which has a molar proportion of

15:9:0.5:0.5 has proved to be especially suitable in the manufacture of the condensation products according to the present invention. In this reaction naphthalene exerts an inhibiting action and benzene an accelerating action on the solidification of the reaction mass. It is easy to control the reaction in any desired direction by varying the quantities of the two components.

Small amounts of iron chloride and other iron compounds likewise retard condensation. If the condensation is carried out in an iron reactor, the small quantities of iron which are detached from the reactor during condensation suffice to bring about the desired inhibiting action so that further addition of iron chloride can be omitted. On the other hand, the use of an excess quantity of iron chloride which prevents the reaction mass from being solidified is to be avoided.

The invention further allows to start condensation in the presence of an alkylene halide in a quantity which is not sufficient for providing the desired solid condensation product and to add further alkylene halide at any time during reaction. The method of heating is also variable. Thus it is feasible to apply higher temperatures immediately at the start of the reaction, or to heat the reaction mass first to relatively low temperatures and to increase the temperature during reaction, or, in the reverse sequence, to initially maintain a high temperature and to subsequently lower the temperature. In the latter case the temperature drop is preferably effected after solidification of the reaction material.

When the condensation has been carried out far enough and the condensation product shows the desired hardness and solidity, the reaction is interrupted and the reaction mass is worked up as usual with condensation products obtained by "Friedel-Crafts"-reactions.

To introduce sulfonic acid groups the condensation products are heated with concentrated sulfuric acid, for instance, such of 99% strength, or with fuming sulfuric acid of 1–20% strength to 80–120° C. for some time, for instance, 8 hours. The choice of the acid depends on the reactivity of the condensation product. The longer the heating period to which a product is subjected after transition from the liquid to the solid state, the stronger the sulfonation agent required. For instance, sulfuric acid of 99% strength is employed for condensation products derived from benzene and ethylene chloride, which were heated after solidification to 80° C. for 15 minutes. Fuming sulfuric acid of 10–20% strength is required for condensation products prepared from ethylene chloride, toluene, benzene and naphthalene which were heated after solidification to 95–100° C. for 2 hours. Besides sulfuric acid and fuming sulfuric acid, other sulfonating agents, for instance chlorosulfonic acid, may be used in the process of the invention. It is further possible to add to the sulfonating acid salts promoting sulfonation, for instance ammonium vanadate. It is a noticeable feature of the sulfonating products that their oxygen content is mostly higher than is characteristic of sulfonic acid; this shows that, besides sulfonation, an oxidation reaction has simultaneously taken place.

The herein described solid condensation products are extraordinarily stable. They are attacked only by concentrated, boiling, acid potassium permanganate solutions and hot nitric acid of at least 64% strength. The cation exchangers prepared from the new condensation products by sulfonation also show a high stability to chemical influences and, therefore, are especially suitable for working up ammoniacal copper salt solutions of the cuprammonium rayon industry, since the cation exchangers employed for this purpose must fulfill high requirements as to stability.

Furthermore, the new sulfonated condensation products have proved to be excellently suitable for use as esterifying and etherifying catalysts and are superior to the hitherto known exchangers containing sulfonic acid groups.

For instance, when the new sulfonated condensation products are employed in the esterification of butylene glycol with valerianic acid which is applied in a small excess, up to 80% of butylene-glycol-bis-valeriate are obtained besides the non-reacted part of the starting material, whereas 35% only of the ester are formed by carrying out the reaction in the presence of a phenol formaldehyde resin containing sulfonic acid groups. When the sulfonated polymer derived from styrene and divinyl benzene is used as catalyst, the ester is obtained in a yield of 30% and the non-esterified butylene glycol is lost by side reactions. Furthermore, the exchanger obtained according to the invention provides a lighter and therefore purer reaction mixture. In the first instance, complete purification and separation of the ingredients is effected by a single distillation; in the second instance, distillation has to be done twice.

The new cation exchangers may further be employed for acetylating carbohydrates which could not be done with the hitherto known exchangers. For instance, by boiling dextrose, dextrin or starch with acetic anhydride in the presence of the cation exchangers obtained according to the invention the acetyl compounds of the said substances can easily be prepared.

Besides esters, also ethers the manufacture of higher homologues of which in the presence of inorganic acids as catalysts as is known involves considerable difficulties, can be produced by means of the new cation exchangers. The reaction is conducted at elevated temperatures, for instance above 150° C., preferably at 190° C. For instance, ethyl-, butyl-, dodecyl- and octadecyl alcohols can easily be converted into the corresponding ethers or mixed ethers. The reaction of lower boiling alcohols is carried out in the vapor phase, whereas the higher boiling alcohols are converted by simple heating in an open reactor for a sufficiently long period. The resulting ether is separated from the non-reacted part of starting material by distillation. When these alcohols are reacted at high temperatures in the presence of phenol formaldehyde resins containing sulfonic acid groups, water is split off and olefines are produced provided that no decomposition occurs, whereas the use of sulfonated polymers derived from styrene and divinyl benzene results in the formation of small quantities of ether besides olefines.

The process according to the invention is particularly suited for continuous operation, for instance, by filling the exchangers into a vertical column and passing a mixture of alcohol and acid, if esters are to be obtained, or alcohols, if ethers are to be obtained, over the exchanger under adequately controlled reaction conditions.

The invention is further illustrated by the following examples without being restricted thereto.

*Example 1*

1 mol of toluene, 1.5 mols of ethylene chloride and 0.112 mol of aluminum chloride are heated to 80–85° C. while continuously stirring. After about 1¾ hours the mass becomes more and more viscous and suddenly changes to a soft rubber-like consistency. Due to the constant stirring operation the material is now present in small particles which become solid and hard after about half an hour. After another half an hour heating is stopped and the reaction mass is allowed to cool. After 24 hours the mass is worked up by decomposing the aluminum chloride-ethylene chloride-complex by means of 50 cc. of concentrated hydrochloric acid and an equal volume of water, decanting the liquid, washing once with water and subjecting the reaction product to steam treatment for removing the non-reacted ethylene chloride. Steaming is followed by washing with dilute sodium hydroxide solution and water. Thereupon the product is dried at about 100° C. 1 part of the condensation product thus obtained is heated with 10–15 parts of fuming sulfuric acid of an $SO_3$ content of 5 per cent to 110–120° C. for 8 hours; the mixture is then filtered and washed until free from acid. The resulting sulfonation product can be employed in a dry or wet condition. The yield amounts to 130 per cent calculated on the weight of the hydrocarbon. The sulfonation product can be employed as exchanger for recovering copper from ammoniacal industrial waste solutions and, in this case, takes up 8–10 per cent of copper calculated on its own weight. After frequently charging and regenerating during an operation period of 1½ years the exchanging capacity of the product is preserved. Its stability to chemical influences is so high that even after standing for some days in ammoniacal copper-containing waste water of the cuprammonium-rayon industry the charged ammoniacal solutions freed from copper run off colorless. In this respect the product is superior to the sulfonated condensation products derived from phenol and formaldehyde which are usually employed for recovering copper from ammoniacal industrial waste water.

*Example 2*

The condensation product prepared as described in Example 1 is sulfonated with fuming sulfuric acid having a $SO_3$ content of 1 per cent by heating to 110° C. for 8 hours, thereafter diluted and freed from acid by washing with distilled water. The exchanger is employed for softening water and, for this purpose, is filled into a vertical tube through which lime-containing well-water is passed downwards. The water employed has initially 19 German degrees of hardness which are reduced to 0.013–0.021 degrees by the above treatment.

After the hardness has increased to 12 degrees because of exhaustion of the exchanger the latter is regenerated by means of dilute hydrochloric acid. The capacity of the exchanger amounts to an average of 60 grams of CaO per 1 kilogram of dry exchanger.

*Example 3*

1 mol of benzene, 3 mols of ethylene chloride and 0.224 mol of aluminum chloride are heated to 75° C. After 1 hour the reaction mass becomes more and more viscous until it suddenly swells up to form a spongy, rubber-like mass of 3 times the original volume. Without removing from the reaction vessel the mass is broken up, stirred for some time and kept at 75° C. for 2 hours. The initially soft, elastic particles of the condensation product have meanwhile solidified and have a porous structure. The resulting product is worked up as described in Example 1. Thereafter it is heated with 20 times the quantity of chlorosulfonic acid to 100° C. for 8 hours. After filtering off and washing the reaction product may be used as cation exchanger either in a wet condition or after drying.

*Example 4*

9 mols of toluene, 0.5 mol of benzene, 0.5 mol of naphthalene, 15 mols of ethylene chloride, and 1.12 mols of aluminum chloride are slowly heated to 80° C. for 1 hour and then to 95° C. in a closed iron vessel which is provided with a stirring apparatus. Two hours after the start of the reaction the mass changes from the liquid to the solid state. Thereafter heating is continued at 100° C. for 1½ hours. The reaction is carried out while continually stirring. The speed of revolution of the stirrer amounts to 25 R. P. M. Except a small portion the total quantity of the reaction mass is divided into grains of 1–2 mm. size. The reaction mass is then placed into an acid-proof container and is freed from the non-reacted part of ethylene chloride by steam treatment, thereafter washed and dried. 1 part of the condensation product thus obtained is sulfonated by heating with 15 parts of fuming sulfuric acid having a $SO_3$ content of 20 per cent to 110° C. for 8 hours and thereafter worked up in the usual manner.

The sulfonation product thus obtained can be dried, for instance at 105–110° C. or higher temperatures without the hazard of the exchanging capacity being impaired. Because of its high stability to chemical influences the product can successfully be employed for recovering copper from ammoniacal industrial waste water and, in this case, adsorbs 8 to 9 per cent of copper calculated on its weight. The product is distinguished by the property that, during charging and regenerating, a change of volume due to swelling and shrinkage either occurs not at all or to an immaterial extent only. The product may also be used for softening water.

*Example 5*

1 mol of toluene, 3 mols of ethylene chloride, 0.224 mol of aluminum chloride are heated to 75° C. with stirring after standing at room temperature for 17 hours. After 1½ hours the reaction mass solidifies. The temperature is kept at 75° C. for a further 1½ hours and the reaction product is worked up as described in Example 1.

60 grams of the condensation product are heated with a solution of 70 grams of chromic anhydride in 360 cc. of concentrated sulfuric acid to 150° C. for 2 hours and the resultant product is filtered, washed and dried. The product which is very firm is capable of adsorbing 2 per cent of copper.

*Example 6*

1,000 cc. (=940 grams) of valerianic acid corresponding to 9.2 mols
400 cc. (=400 grams) of butylene glycol corresponding to 4.5 mols
250 cc. of toluene
140 grams of an exchanger produced according to Example 4 are heated on the oil-bath to 130–140° C. until water is no longer distilled over together with the toluene. During distillation the toluene is separated from water and led back into the reaction vessel. Thereafter the exchanger is filtered off; a filtrate colored weakly yellow is obtained, which is fractionally distilled in vacuo. After the first runnings consisting substantially of toluene and valerianic acid, the resulting ester distills over at 157–163° C. under 15 mm. pressure. The yield amounts to about 80 per cent of theory. The same yield is obtained by means of the same exchanger which has repeatedly been employed for preparing esters.

When sulfonated copolymers of styrene and divinylbenzene are employed in the above reaction a dark colored reaction liquid forms. The yield of ester amounts to about 30 per cent, and to 27.5 per cent when the exchanger is employed twice. The valerianic acid is recovered; the non-esterified part of butylene glycol is lost however by side reactions. When the reaction is carried out in the presence of phenol-formaldehyde resins containing sulfonic acid groups as catalyst only 35 per cent of ester are obtained. The non-reacted part of starting material can be recovered in this case.

*Example 7*

40 grams of water-soluble starch
20 grams of an exchanger produced as described in Example 4
400 cc. of acetic anhydride are refluxed so that the liquid boils vivaciously and no starch deposits on the bottom of the reaction vessel. Boiling is continued until the reactants dissolve, the exchanger is then separated by filtering, and the resultant acetylation product is precipitated from the filtrate by gradual addition of water, thereafter washed and dried. The yield amounts to 95 per cent of theory; the reaction product contains 63.53 per cent of acetic acid; it softens at 172° C. and melts at 256° C. No acetylation occurs when the reaction is carried out in the presence of formaldehyde phenol resins containing sulfonic acid groups.

*Example 8*

190 grams of dodecyl alcohol
35 grams of the exchanger produced as described in Example 4 are heated in an open flask to 190–195° C. Water is distilled off during heating. After distillation of water has ceased heating is continued for a further 8–12 hours. Thereupon the reaction mass is filtered off and the filtrate is distilled in vacuo. The unchanged part of starting material distills over at 150–160° C. under 15 mm. pressure. Distillation of the ether has to be performed at a lower pressure. Didodecyl ether distills over at 176–179° C. under 0.15–0.25 mm. pressure. The product which melts at 33° C. is obtained in a yield of 70 per cent.

When, instead of the new exchanger, the sulfonated copolymer of styrene and divinylbenzene is employed in the above process, dodecene (up to 45 per cent of theory) and only 31 per cent of didodecyl ether are obtained.

*Example 9*

In an 1.5 m. long, vertical iron tube which is closed at the bottom and has an inside diameter of 35 mm. there is located in an air-tight manner another 1 cm. thick, more than 1.5 m. long, tube almost extending to the bottom of the iron tube and connected at its projecting part to a dropping funnel. The tube of the larger diameter supports, about 10 cm. below its upper end—similar to a fractionating flask—a small, downwardly bent tube which is connected to a condenser. The space between the two tubes is filled with granular exchanger which is prepared according to Example 4 and dried at 150° C. before it is used.

The apparatus is then heated to 170–180° C. on the oil-bath and ethylene alcohol is run in through the dropping funnel at the rate at which the reaction mixture distills over from the tube filled with the exchanger, i. e. about 130 cc. of alcohol per hour.

The distillate is fractionally distilled. The yield of ether amounts to 29 per cent for each passage of the alcohol through the tube. The recovered alcohol is employed for further passages.

We claim:

1. Process for the production of cation exchanging resins which comprises reacting (1) a liquid methyl-substituted benzene hydrocarbon with (2) a polyhalogenated saturated aliphatic hydrocarbon, which is substituted by at least two halogen atoms, selected from the group consisting of chlorine, bromine and iodine in the presence of a Friedel-Crafts catalyst and at elevated temperature, at least until the reaction products obtained are hard, non-plastic and infusible resins, and treating said resins with sulfonating agents.

2. Process according to claim 1, wherein the reaction of the liquid hydrocarbon (1) and the polyhalogenated aliphatic hydrocarbon (2) is carried out in the presence of an added solid polynuclear aromatic hydrocarbon.

3. Process according to claim 1, wherein the reaction of the liquid hydrocarbon (1) and the polyhalogenated aliphatic hydrocarbon (2) is carried out in the presence of benzene.

4. Process according to claim 1, wherein the polyhalogenated aliphatic hydrocarbon used is an ethylene dichloride.

5. Process according to claim 1, wherein the catalyst used is $AlCl_3$.

6. Process according to claim 1, wherein 1 mol of liquid hydrocarbons (1) is reacted with at least 1.3 mols of ethylene dichloride.

7. Process according to claim 1, wherein 1 mol of toluene is reacted with at least 1.3 mols of ethylene dichloride in the presence of $AlCl_3$ catalyst.

8. Process according to claim 1, wherein 1 mol of a mixture of toluene, benzene and naphthalene is reacted with at least 1.3 mols of ethylene dichloride in the presence of $AlCl_3$ catalyst.

9. Process for removing cations from aqueous liquids which comprises treating said liquids with a resin obtained by the process of claim 1.

10. Cation exchanging resins obtained by the process of claim 1.

11. In a process of etherifying organic compounds in the presence of a catalyst, the improvement which comprises carrying out this process in the presence of cation exchanging resins obtained by the process of claim 1.

12. The process of claim 11 wherein the organic compounds etherified are aliphatic alcohols.

13. In a process of esterifying organic compounds in the presence of a catalyst, the improvement which comprises carrying out this process in the presence of cation exchanging resins obtained by the process of claim 1.

14. The process of claim 13 wherein the esterification is that of an aliphatic alcohol with a higher aliphatic carboxylic acid.

15. The process of claim 13 wherein the esterification is that of carbohydrates with acylating agents.

16. The process of claim 13 wherein the esterification is that of carbohydrates with acetylating agents.

References Cited in the file of this patent

UNITED STATES PATENTS

| | | |
|---|---|---|
| 2,016,026 | Shinkle | Oct. 1, 1935 |
| 2,235,971 | Wilson | Mar. 25, 1941 |
| 2,628,193 | D'Alelio | Feb. 10, 1953 |

OTHER REFERENCES

Kressman: Research, page 217, May 1952.